United States Patent
Slater et al.

(10) Patent No.: US 6,654,796 B1
(45) Date of Patent: Nov. 25, 2003

(54) SYSTEM FOR MANAGING CLUSTER OF NETWORK SWITCHES USING IP ADDRESS FOR COMMANDER SWITCH AND REDIRECTING A MANAGING REQUEST VIA FORWARDING AN HTTP CONNECTION TO AN EXPANSION SWITCH

(75) Inventors: Charles Slater, Sunnyvale, CA (US); Krishna Rao Chennapragada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/415,375

(22) Filed: Oct. 7, 1999

(51) Int. Cl.[7] .............................. G06F 15/177
(52) U.S. Cl. ................ 709/220; 709/201; 709/203; 709/221; 709/222; 709/223; 709/236
(58) Field of Search ................ 709/201, 220, 709/221, 222, 223, 236, 203

(56) References Cited

U.S. PATENT DOCUMENTS

| | | | |
|---|---|---|---|
| 5,319,644 A | 6/1994 | Liang | 370/85.5 |
| 5,367,635 A | 11/1994 | Bauer et al. | 395/200 |
| 5,390,170 A | 2/1995 | Sawant et al. | 370/58.1 |
| 5,473,607 A | 12/1995 | Hausman et al. | 370/85.13 |
| 5,502,725 A | 3/1996 | Pohjakallio | 370/94.1 |
| 5,530,963 A | 6/1996 | Moore et al. | 395/200.15 |
| 5,678,006 A | 10/1997 | Valizadeh et al. | 395/200.02 |
| 5,715,394 A | 2/1998 | Jabs | 395/200.11 |
| 5,734,654 A | 3/1998 | Shirai et al. | 370/396 |

(List continued on next page.)

FOREIGN PATENT DOCUMENTS

EP  0 567 217  10/1993  ........... H04L/12/46

OTHER PUBLICATIONS

"Active Software's Integration System", Active Software, Inc., printed from http://www.activesw.com/products/products.html, on Jul. 24, 1998.

Bracho, Dr. Rafael, "Integrating the Corporate Computing Environment with Active Software", Nov. 18, 1998, Active Software, Inc., pp. 1–17.

Bracho, Dr. Rafael, "Mastering Corporate Computing with the ActiveWeb System", 1996, Active Software, Inc.

Cisco Systems, Inc., "Configuration and Management", printed from http://www.cisco.com/univercd/cc/td/doc/product/lan/2801900/1928v67x/19icg67x/19icoutb.htm, on May 27, 1999, 62 pages.

(List continued on next page.)

Primary Examiner—Nabil El-Hady
(74) Attorney, Agent, or Firm—Thelen Reid & Priest, LLP; David B. Ritchie

(57) ABSTRACT

A group of network devices, such as Ethernet switches, are logically configured as a single cluster, with one commander device and one or more expansion devices. Each device in the cluster contains an embedded HTML server that facilitates configuration and management of the network device via a management station running a Web browser. Each device in the cluster is identified by a unique Universal Resource Locator ("URL"). However, only the cluster commander is required to have an IP address. The cluster commander redirects and translates configuration and management requests from the Web browser on the management station so that requests are processed by the appropriate device in the cluster. The exchange of information between the Web browser on the management station and the devices in a cluster is accomplished via redirection of HTTP GET and POST methods. This provides a consistent, device-independent interface between the device and the Web browser on the management station.

56 Claims, 10 Drawing Sheets

U.S. PATENT DOCUMENTS

| | | | | |
|---|---|---|---|---|
| 5,802,047 A | | 9/1998 | Kinoshita | 370/359 |
| 5,812,529 A | | 9/1998 | Czarnik et al. | 370/245 |
| 5,812,776 A | | 9/1998 | Gifford | 395/200.47 |
| 5,845,087 A | | 12/1998 | Trehus | 395/200.72 |
| 5,867,666 A | | 2/1999 | Harvey | 395/200.68 |
| 5,872,783 A | | 2/1999 | Chin | 370/392 |
| 5,918,016 A | | 6/1999 | Brewer et al. | 395/200.5 |
| 5,968,116 A | | 10/1999 | Day, II et al. | 709/202 |
| 5,974,453 A | | 10/1999 | Andersen et al. | 709/220 |
| 5,991,810 A | | 11/1999 | Shapiro et al. | 709/229 |
| 6,006,264 A | * | 12/1999 | Colby et al. | 709/226 |
| 6,018,770 A | | 1/2000 | Little et al. | 709/223 |
| 6,021,429 A | | 2/2000 | Danknick | 709/208 |
| 6,047,376 A | | 4/2000 | Hosoe | 713/201 |
| 6,055,236 A | | 4/2000 | Nessett et al. | 370/389 |
| 6,092,196 A | | 7/2000 | Reiche | 713/200 |
| 6,122,657 A | * | 9/2000 | Hoffman et al. | 709/201 |
| 6,330,602 B1 | * | 12/2001 | Law et al. | 709/224 |
| 6,378,053 B1 | * | 4/2002 | Lamaire et al. | 711/159 |
| 6,470,389 B1 | * | 10/2002 | Chung et al. | 709/227 |

OTHER PUBLICATIONS

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "LAN Switching", printed from http://www.cisco.com/univercd/cc/td/doc/cisntwk/ics/cs010.htm, on May 27, 1999, 6 pages.

Cisco Systems, Inc., "Web–Based Management", printed from http://ww.cisco.com/univercd/cc/td/doc/product/lan/c2900xl/c2900sa3/sa3icg/mainstal.htm #11811, on May 28, 1999, 44 pages.

Droms, R., "Dynamic Host Configuration Protocol," Network Working Group, RFC 1531, Oct. 1993.

Edell, Richard, "Bay Bridge Software Architecture", May 17, 1994, Univ. of California, Berkeley, CA, Department of Electrical Engineering and Computer Science.

"Regain Confidence and Control Over Your IP Address Infrastructre", Network Registrar, American Internet Corporation, Bedford, MA., 1998.

* cited by examiner

```
typedef struct cluster_member_ {
    ushort  mbr_num;                    /* Number asigned to this member (0xFFFF if
                                           non-member) */
    ushort  tp_flags;                   /* CMP Transport flags for this member */
    uchar   mbr_flags;                  /* Active - 0x01, Inactive 0x00 */
    uchar   mbr_heartbeat;              /* 0 each time hb is rcvd from cmdr; increment
                                           each time a heartbeat is sent. Should be 0
                                           or 1 most of the time. */
    uchar   mbr_numhops;                /* # CDP hops from commander */
    uchar   mbr_update;                 /* Counter for automatic neighbor updates */
    ipaddrtype mbr_cmpaddr;             /* assigned CMP address */
    ipaddrtype mbr_ipaddr;              /* regular IP address */
    ipaddrtype cmdr_ipaddr;             /* IP address of member's commander */
    ipaddrtype cmdr_cmpaddr;            /* CMP address assigned to commander */
    uchar   cmdr_macaddr[IEEEBYTES];    /* MAC addr of member's commander */
    uchar   mbr_macaddr[IEEEBYTES];     /* store instead of get each time */
    uchar   mbr_CmdPortID[CDP_MAX_PORT_ID_STR_LEN];
    uchar   platform_name[CDP_MAX_PLATFORM_STR_LEN];
    uchar   host_name[MAX_HOST_NAME];
    uchar   cluster_name[MAX_CLUSTER_NAME];
} cluster_member;
```

FIG. 13

```
typedef struct cluster_neighbor_ { ipaddrtype cn_cmpaddr;                          /* IP address assigned to the neighbor */ ipaddrtype cn_ipaddr;                           /* Neighbor's assigned IP address */ ulong cn_capabilities;                          /* reg_invoke_edp_lookup_cache_info_1 */ ushort cn_mbrnum;                               /* 0xFFF if not a stack member */ uchar cn_qualification;                         /* 0 Qualified
                                                   1 Not cluster capable (no CMP hello)
                                                   2 Not cluster capable (ver mismatch)
                                                   3 cluster capable, STP-BLK at either end
                                                   4 Belongs to a different stack */ uchar cn_qualification_note;                    /* 0x01 Has Configured IP address
                                                   0x02 Saw > 1 CDP neighbor, not point-to-point
                                                   0x04 Sender port is Fast Ethernet */ uchar cn_sender_numhops;                        /* 0-MAX_CLUSTER_SIZE, number of CDP hops to
                                                   commander */ uchar cn_mbr_fec_number;                        /* 0 if single port, 1-MAX_FEC if grpd */ uchar cn_fec_number;                            /* 0 if single port, i MAX_FEC if grpd */ uchar cn_pad;                                   /* Keep it even */ uchar cn_macaddr[IEEEBYTES];                    /* MAC address of CDP sender */ uchar cn_port_macaddr[IEEEBYTES];               /* MAC address of CDP sender port */ uchar cn_cmdr_macaddr[IEEEBYTES];               /* MAC addr of sender's commander */ uchar cn_portID[CDP_MAX_PORT_ID_STR_LEN];       /* CDP sender Port ID */ uchar cn_mbr_portID[CDP_MAX_PORT_ID_STR_LEN];   /* Receiving port's ID */ uchar cn_hostname[MAX_HOST_NAME];               /* Sender platform str */ uchar cn_platform_name[CDF_MAX_PLATFORM_STR_LEN];

} cluster_neighbor;
```

*FIG. 14*

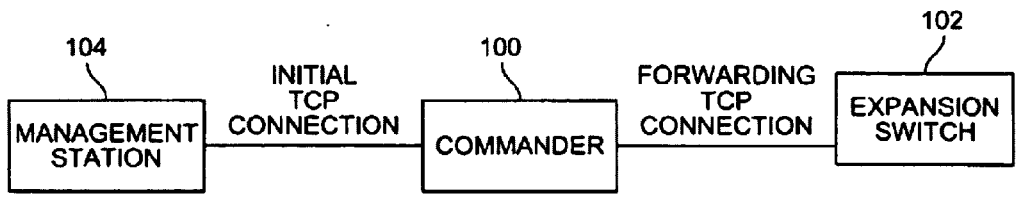

*FIG. 15*

SYSTEM FOR MANAGING CLUSTER OF NETWORK SWITCHES USING IP ADDRESS FOR COMMANDER SWITCH AND REDIRECTING A MANAGING REQUEST VIA FORWARDING AN HTTP CONNECTION TO AN EXPANSION SWITCH

BACKGROUND OF THE INVENTION

1. Field of the Invention

The present invention relates to the field of data communications networks. More particularly, the present invention relates to Hypertext Transfer Protocol ("HTTP") redirection of configuration data for network devices.

2. Background

A network is a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

A local area network ("LAN") is a network that is located in a relatively small physical area, such as a building, in which computers and other network devices are linked, usually via a wiring-based cabling scheme. A LAN typically includes a shared medium to which workstations attach and through which they communicate. LANs often use broadcasting methods for data communication, whereby any device on the LAN can transmit a message that all other devices on the LAN then "listen" to. However, only the device or devices to which the message is addressed actually receive the message. Data is typically packaged into frames for transmission on the LAN.

Currently, the most common LAN media is Ethernet, which traditionally has a maximum bandwidth of 10 Mbps. Traditional Ethernet is a half-duplex technology, in which each Ethernet network device checks the network to determine whether data is being transmitted before it transmits, and defers transmission if the network is in use. In spite of transmission deferral, two or more Ethernet network devices can transmit at the same time, which results in a collision. When a collision occurs, the network devices enter a back-off phase and retransmit later.

As more network devices are added to a LAN, they must wait more often before they can begin transmitting, and collisions are more likely to occur because more network devices are trying to transmit. Today, throughput on traditional Ethernet LANs suffers even more due to increased use of network-intensive programs, such as client-server applications, which cause hosts to transmit more often and for longer periods of time.

FIG. 1 is a block diagram illustrating a network connection between a user 10 and a server 20. FIG. 1 is an example which may be consistent with any type of network, including a LAN, a wide area network ("WAN"), or a combination of networks, such as the Internet.

When a user 10 connects to a particular destination, such as a requested web page on a server 20, the connection from the user 10 to the server 20 is typically routed through several routers 12A–12D. Routers are internetworking devices. They are typically used to connect similar and heterogeneous network segments into Internetworks. For example, two LANs may be connected across a dial-up line, across the Integrated Services Digital Network ("ISDN"), or across a leased line via routers. Routers may also be found throughout the Internet. End users may connect to a local Internet Service Provider ("ISP") (not shown).

As the data traffic on a LAN increases, users are affected by longer response times and slower data transfers, because all users attached to the same LAN segment compete for a share of the available bandwidth of the LAN segment (e.g., 10 Mbps in the case of traditional Ethernet). Moreover, LANs commonly experience a steady increase in traffic even if the number of users remains constant, due to increased network usage of software applications using the LAN. Eventually, performance drops below an acceptable level and it becomes necessary to separate the LAN into smaller, more lightly loaded segments.

LANs are becoming increasingly congested and overburdened. In addition to an ever-growing population of network users, several factors have combined to stress the capabilities of traditional LANs, including faster computers, faster operating systems, and more network-intensive software applications.

There are two traditional approaches to relieving LAN congestion. The first is to simply install a faster networking technology, such as FDDI, ATM, or Fast Ethernet. However, these approaches are expensive to implement. The other traditional approach is to use bridges and routers to reduce data-traffic between networks. This solution is also relatively expensive both in money and configuration time, and is only effective when inter-segment traffic is minimal. When inter-segment traffic is high, some bridges and routers can become a bottleneck due to their limited processing power. They also require extensive setup and manual configuration in order to maintain their performance. In addition, despite large buffers, packet loss is always a possibility.

Switching is a technology that alleviates congestion in Ethernet, Token Ring, and Fiber Distributed Data Interface (FDDI) and other similar LANs by reducing traffic and increasing bandwidth. LAN switches are designed to work with existing media infrastructures so that they can be installed with minimal disruption of existing networks.

A Media Access Control ("MAC") address is the unique hexadecimal serial number assigned to each Ethernet network device to identify it on the network. With Ethernet devices, this address is permanently set at the time of manufacture. Each network device has a unique MAC address, so that it will be able to receive only the frames that were sent to it. If MAC addresses were not unique, there would be no way to distinguish between two stations. Devices on a network monitor network traffic and search for their own MAC address in each frame to determine whether they should decode it or not. Special circumstances exist for broadcasting to every device on the network.

Ethernet uses variable-length frames of data to transmit information from a source to one or more destinations. Every Ethernet frame has two fields defined as the source and destination addresses, which indicate the MAC addresses of the network devices where a frame originated and where it is ultimately destined, respectively. FIG. 2-A illustrates the structure of an Ethernet frame, as defined by the IEEE. As shown in FIG. 2-A, the Ethernet frame 22 includes a Preamble 24, a Start of Frame Delimiter 26, a Destination Address 28, a Source Address 30; a Length of data field 32, a variable-length Data field 34, a Pad 36, and a Checksum 38. The Preamble 24 is a seven-byte field, with each byte containing the bit pattern 10101010 to allow for clock synchronization between sending and receiving stations (not shown). The Start of Frame Delimiter 26 is a one-byte field containing the bit pattern 10101011 to denote the start of the frame itself. The Destination Address 28 and the Source Address 30 are typically six-byte fields which specify the unique MAC addresses of the receiving and sending stations. Special addresses allow for multicasting to a group of stations and for broadcasting to all stations on the network. The Length of Data field 32 specifies the number of bytes present in the Data field 34, from a minimum of 0 to a maximum of 1500. The Pad field 36 is used to fill out the length of the entire frame 22 to a minimum of 64 bytes when the Data field 34 contains a small number of bytes. Finally, the Checksum field 38 is a 32-bit hash code of the Data field 34, which can used by the receiving station to detect data transmission errors.

In the-context of the present invention, the term "switching" refers to a technology in which a network device (known as a switch) connects two or more LAN segments. A switch transmits frames of data from one segment to their destinations on the same or other segments. When a switch begins to operate, it examines the MAC address of the frame that flow through it to build a table of known sources. If the switch determines that the destination of a frame is on the same segment as the source of the frame, it drops, or filters, the frame because there is no need to transmit it. If the switch determines that the destination is on another segment, it transmits the frame onto the destination segment only. Finally, using a technique known as flooding, if the destination segment is unknown, the switch transmits the frame on all segments except the source segment.

Logically, a LAN switch behaves similarly to a bridge, which is a different kind of network device. The primary difference is that switches have higher data throughput than bridges, because their, frame forwarding algorithms are typically performed by application-specific integrated circuits ("ASICs") especially designed for that purpose, as opposed to the more general purpose (and relatively slower) microprocessors typically used in bridges. Like bridges, switches are designed to divide a large, unwieldy local network into smaller segments, insulating each segment from local traffic on other segments, thus increasing aggregate bandwidth while still retaining full connectivity, Switches typically have higher port counts than bridges, allowing several independent data paths through the device. This higher port count also increases the data throughput capabilities of a switch.

Because a switch maintains a table of the source MAC addresses received on every port, it "learns" to which port a station is attached every time the station transmits. Then, each packet that arrives for that station is forwarded only to the correct port, eliminating the waste of bandwidth on the other ports. Since station addresses are relearned every time a station transmits, if stations are relocated the switch will reconfigure its forwarding table immediately upon receiving a transmission from the stations.

Referring now to FIG. 2-B, a block diagram of an Ethernet switch according to one aspect of the present invention is shown. As shown in FIG. 2-B, Ethernet switch 200 includes a Layer 1 Physical Interface ("PHY") 202, 204, and a Layer 2 Media Access Control Interface ("MAC")

206, 208, for each port on the Ethernet switch 200. A network interface card ("NIC") consists of a MAC and a PHY. An Ethernet switch also contains a MAC and PHY on every port. Thus, an Ethernet switch may appear to a network as multiple NICs coupled together. Each switch PHY 202, 204, receives the incoming data bit stream and passes it to its corresponding MAC 206, 208, which reassembles the original Ethernet frames.

Ethernet switch 200 also includes a frame buffer memory 210, 212, for each port, a source address table memory 220, discovery protocol logic 230, learning logic 240, forwarding logic 250, packet redirection logic 260, and a configuration and management interface 270. During operation, the learning logic 240 will look at the source address ("SA") within a received Ethernet frame and populate the Source Address Table ("SAT") memory 220 with three columns: MAC address 280, port number 282, and age 284. The MAC address is the same as the source address that a sender has embedded into the frame. The age item will be a date stamp to indicate when the last frame was received from a particular MAC SA. In the example shown in FIG. 2-B, the port number may be 1 or 2. The SAT is also known as the Switch Forwarding Table ("SFT").

Forwarding logic 250 examines at the destination address ("DA") of a received Ethernet frame. This now becomes the new MAC address, which is then compared with the entries in the SAT. Four different forwarding options are possible. If the destination address is a specific address, known as a "broadcast" address, the frame is destined for all ports on the network. In this case, the Ethernet switch will forward the frame to all ports, except the one on which the frame was received. A broadcast address is six bytes with all ones, or "FF.FF.FF.FF.FF.FF" in hexadecimal notation. If the MAC address is found in the SAT and the corresponding port number is different from the received port, the frame is forwarded to that particular port number only. If the MAC address is found in the SAT and the port number is the same as the received port number, the frame is not forwarded; instead, it is discarded. This is known as "filtering." The frame is discarded because the transmitting station and the receiving station are connected on the same shared LAN segment on that particular port and the receiver has already tuned into the frame. If the MAC address is not found in the table, the frame is forwarded to all ports. The reason a particular destination address is not present in the SAT table is that the receiving device could be new on the network, or the recipient has been very quiet (has not recently sent a frame). In both cases, the bridge SAT will not have a current entry. Flooding the frame on all ports is the brute way of ensuring that the frame is routed to its intended recipient.

Ethernet switch 200 uses the "age" entry in the SAT to determine whether that MAC address is still in use on the LAN. If the age has exceeded a certain preset value, the entry is removed. This conserves memory space and makes the bridge faster because fewer entries need to be scanned for address matching. Finally, the frame buffer memories 210, 212 will store frames on each port in case there is a backlog of frames to be forwarded.

According to embodiments of the present invention, discovery protocol logic 230 receives, processes, and sends CDP or other discovery protocol packets to neighboring network devices on the network. Packet redirection logic 260 examines the source and destination addresses of Ethernet packets under control of the configuration and management interface 270 and forwards them to other network devices in a cluster configuration.

An Ethernet LAN switch improves bandwidth by separating collision domains and selectively forwarding traffic to the appropriate segments. FIG. 3 illustrates the topology of a typical Ethernet network 40 in which a LAN switch 42 has been installed. With reference now to FIG. 3, exemplary Ethernet network 40 includes a LAN switch 42. As shown in FIG. 3, LAN switch 42 has five ports: 44, 46, 48, 50, and 52. The first port 44 is connected to LAN segment 54. The second port 46 is connected to LAN segment 56. The third port 48 is connected to LAN segment 58. The fourth port 50 is connected to LAN segment 60. The fifth port 52 is connected to LAN segment 62. The Ethernet network 40 also includes a plurality of servers 64-A–64-C and a plurality of clients 66-A–66-K, each of which is attached to one of the LAN segments 54, 56, 58, 60, or 62. If server 64-A on port 44 needs to transmit to client 66-D on port 46, the LAN switch 42 forwards Ethernet frames from port 44 to port 46, thus sparing ports 48, 50, and 52 from frames destined for client 66-D. If server 64-C needs to send data to client 66-J at the same time that server 64-A sends data to client 66-D, it can do so because the LAN switch can forward frames from port 48 to port 50 at the same time it is forwarding frames from port 44 to port 46. If server 64-A on port 44 needs to send data to client 66-C, which is also connected to port 44, the LAN switch 42 does not need to forward any frames.

Performance improves in LANs in which LAN switches are installed because the LAN switch creates isolated collision domains. Thus, by spreading users over several collision domains, collisions are avoided and performance improves. In addition, many LAN switch installations dedicate certain ports to a single users, giving those users an effective bandwidth of 10 Mbps when using traditional Ethernet.

As a LAN grows, either due to additional users or network devices, additional switches must often be added to the LAN and connected together to provide more ports and new network segments. One way to connect multiple LAN switches together is to cascade them using high-speed ports. However, when cascading LAN switches, the interswitch bandwidth is limited by the number of connections between switches.

Referring now to FIG. 4, two LAN switches 70-A and 70-B are shown, connected in a cascaded configuration. As shown, each of the LAN switches 70-A and 70-B contains eight ports, 72-A–72-H and 74-A–74-H. On each of the LAN switches 70-A and 70-B, four ports 72-A–72-D and 74-A–74-D are connected to computer workstations 76-A–76-D and 76-E–76-H, respectively. The other four ports on each LAN switch (i.e., ports 72-E–72-H on LAN switch 70-A, and ports 74-E–74-H on LAN switch 70-B) are dedicated to interswitch communication. For example, if each of the four interswitch connections is capable of supporting a 100 Mbps Fast Ethernet channel, the aggregate interswitch communication rate of the switches connected as shown in FIG. 4 is 400 Mbps. However, the total number of ports available for connecting to workstations or other network devices on each LAN switch is diminished due to the dedicated interswitch connections that are necessary to implement the cascaded configuration.

As a LAN grows, network devices are typically added to the LAN and interconnected according to the needs of the particular LAN to which they belong. For example, FIG. 5 illustrates an exemplary group of network devices in LAN 78, and the interconnections between the network devices in the LAN 78. As shown in FIG. 5, the LAN 78 includes seven network devices: six LAN switches 80-A–80-F and a router 82. Each network device is connected to one or more of the other network devices in the LAN 78. Computer workstations, network printers and other network devices are also connected to the LAN 78, but not shown. It is to be understood that the LAN configuration shown in FIG. 5 is exemplary only, and not in any way limiting.

Regardless of the method used to interconnect them, network devices such as LAN switches need to be configured and managed, because they typically include a number of programmable features that can be changed by a network administrator for optimal performance in a particular network. Without limitation, such features typically include whether each port on the network device is enabled or disabled, the data transmission speed setting on each port, and the duplex setting on each port. Many commercially-available network devices contain embedded HTML Web servers, which allow the network device to be configured and managed remotely via a Web browser.

Traditionally, network device installation includes inserting the device into the network and assigning it an Internet Protocol ("IP") address, which is a 32-bit number assigned to hosts that want to participate in a TCP/IP Internet. The IP address of a network device is a unique address that specifies the logical location of a host or client on the Internet.

Once a network device has been assigned an IP address, a network administrator can enter the device's IP address or URL into a Web browser such as Netscape Navigator™, available from Netscape Communications Corp. of Mountain View, Calif., or Internet Explorer™, available from Microsoft Corporation of Redmond, Wash., to access the network device and configure it from anywhere in the Internet. However, each network device to be configured must have its own IP address, which must be registered with a domain name service ("DNS"). Assigning an IP address to each and every network device is undesirable, because registering IP addresses with a DNS is both costly and cumbersome.

Accordingly, it would be convenient for a network administrator to be able to assign a single IP address to one network device in a cluster, and then to be able to configure and manage all of the network devices in the cluster using this single IP address. Unfortunately, no current mechanism exists to enable this activity. Accordingly, it is an object of the present invention to provide a method and apparatus which permits an entire cluster of network devices to share a single IP address, and to provide a commander device which redirects data requests and responses to and from other devices in the cluster.

SUMMARY OF THE INVENTION

A group of network devices, such as Ethernet switches, are logically configured as a single cluster, with one commander device and one or more expansion devices. Each device in the cluster contains an embedded HTML server that facilitates configuration and management of the network device via a management station running a Web browser. Each device in the cluster is identified by a unique Universal Resource Locator ("URL"). However, only the cluster commander is required to have an IP address. The cluster commander redirects and translates configuration and management requests from the Web browser on the management station so that requests are processed by the appropriate device in the cluster. The exchange of information between the Web browser on the management station and the devices in a cluster is accomplished via redirection of HTTP GET and POST methods. This provides a consistent, device-independent interface between the device and the Web browser on the management station.

BRIEF DESCRIPTION OF THE DRAWINGS

FIG. 2-B is a block diagram of an Ethernet switch in accordance with one aspect of the present invention.

FIG. 13 illustrates the contents of the cluster_member data structure according to one embodiment of the present invention.

FIG. 14 illustrates the contents of the cluster_neighbor data structure according to one embodiment of the present invention.

FIG. 15 is a block diagram illustrating HTTP redirection of configuration data according to one embodiment of the present invention.

DETAILED DESCRIPTION OF THE PREFERRED EMBODIMENTS

Figure 1:
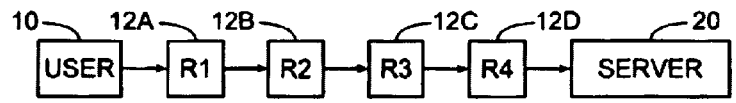
FIG. 1 is a block diagram of an exemplary network connection between a user and a server.
Figure 2A:
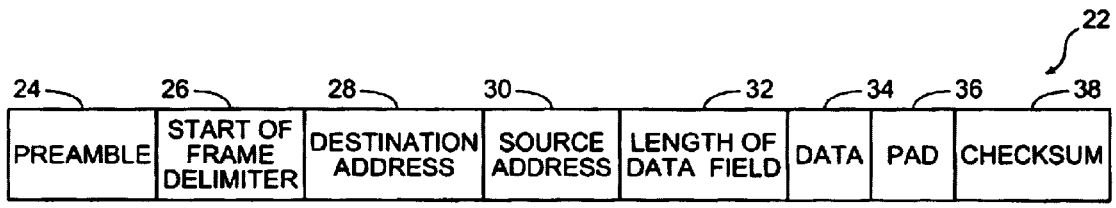
FIG. 2-A is a diagram illustrating the structure of an Ethernet data frame.
Figure 2B:
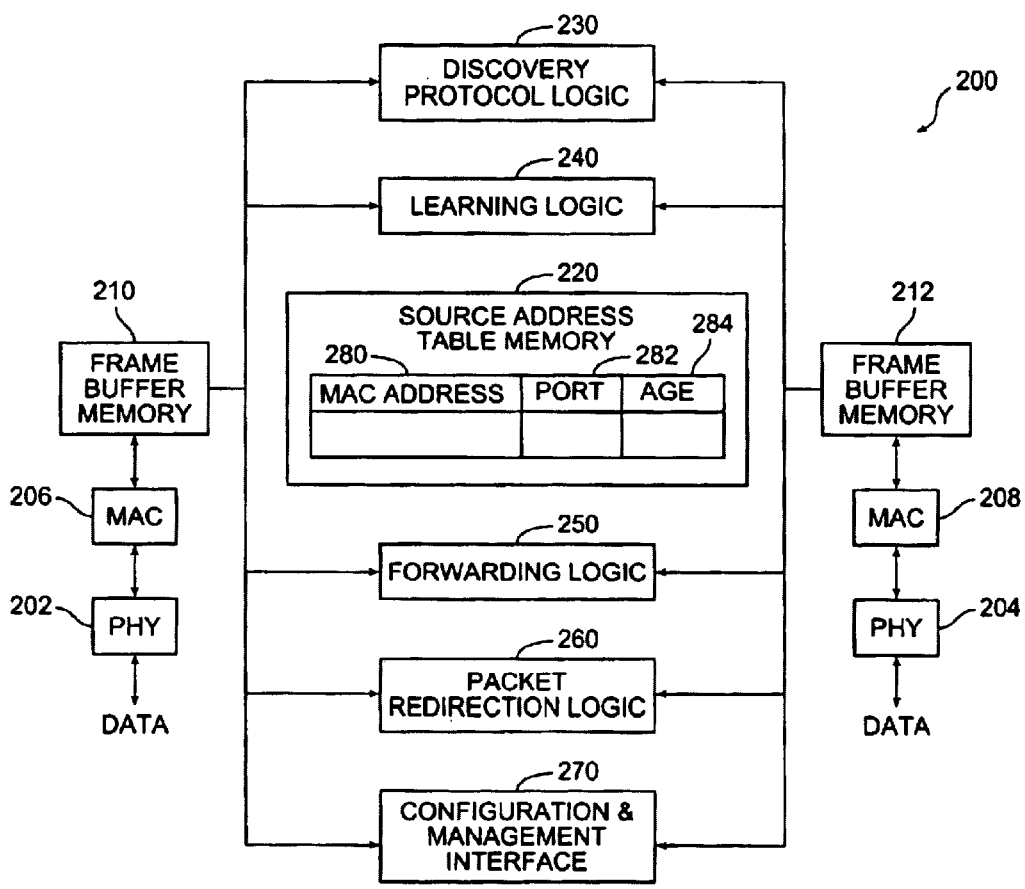
Figure 3:
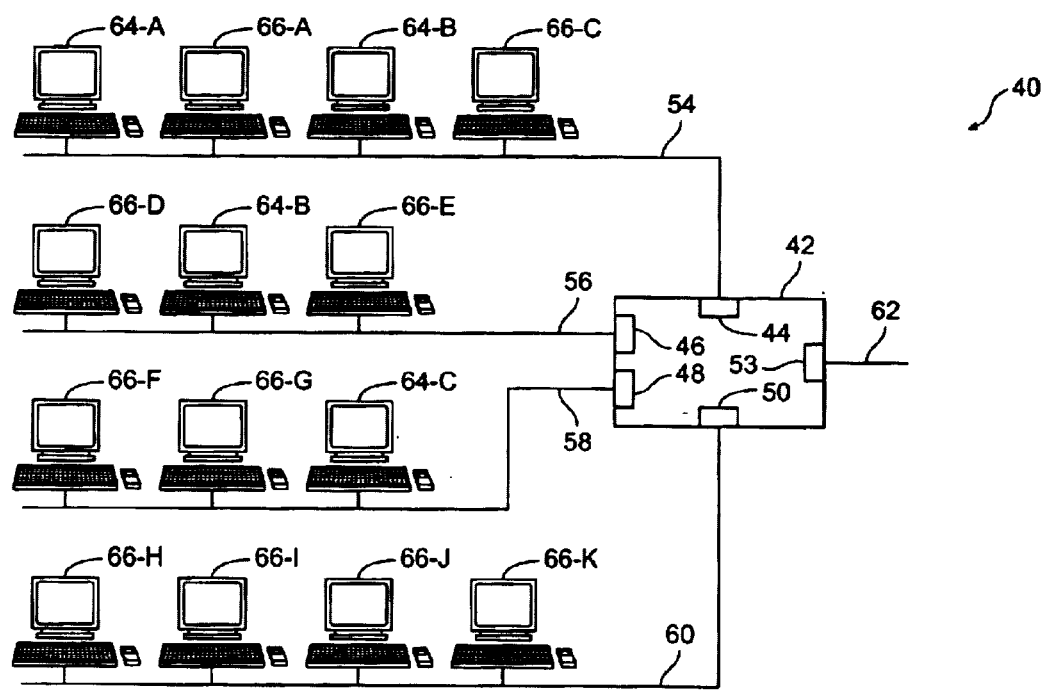
FIG. 3 is a block diagram illustrating the topology of an exemplary LAN incorporating a LAN switch.
Figure 4:
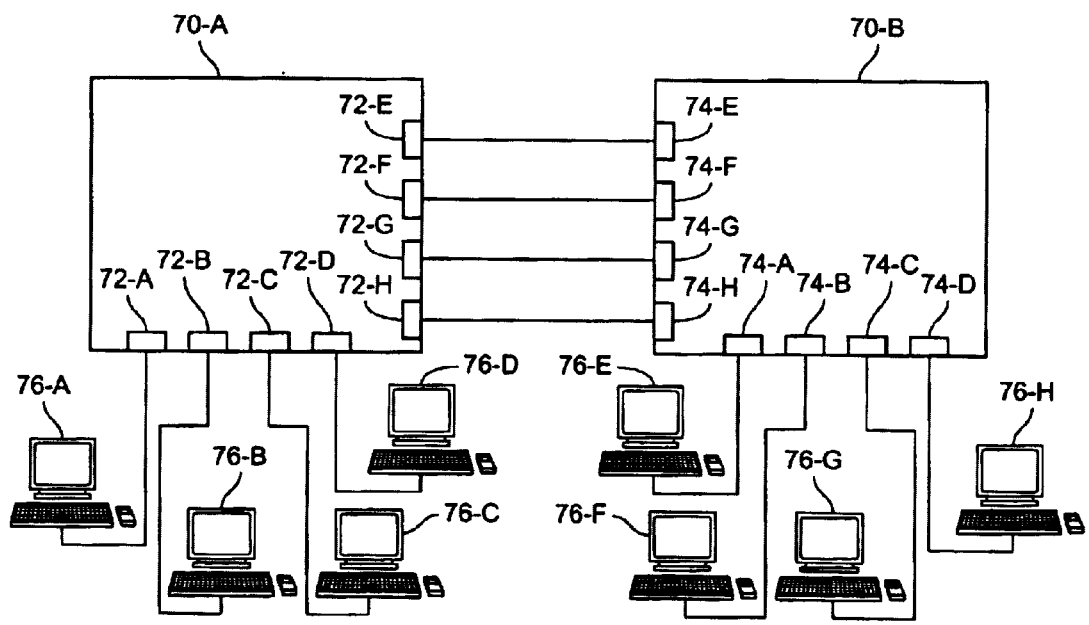
FIG. 4 is a block diagram illustrating an exemplary LAN with two LAN switches interconnected in a cascaded configuration.
Figure 5:
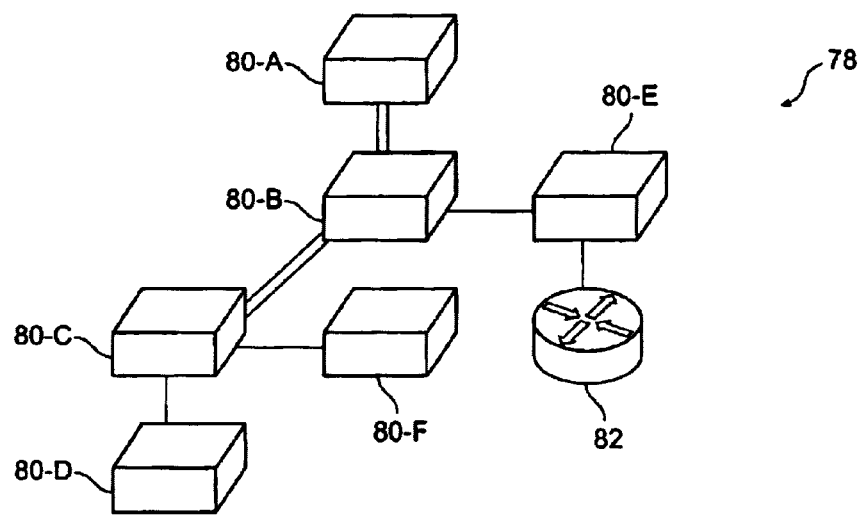
FIG. 5 is a block diagram illustrating the topology of an exemplary LAN incorporating six LAN switches and a router.

Those of ordinary skill in the art will realize that the following description of the present invention is illustrative only and not in any way limiting. Other embodiments of the invention will readily suggest themselves to such skilled persons having the benefit of this disclosure.

Network devices, such as LAN switches, may be configured and managed using either out-of-band or in-band techniques. Out-of-band configuration and management are typically performed by connecting to the console port on the network device and using the management console locally from a terminal or remotely through a modem. Alternatively, network devices may be configured and managed "in-band," either by connecting via Telnet to the network device and using a management console, or by communicating with the network device's in-band management interface using the industry standard Simple Network Management Protocol ("SNMP"). This can be accomplished by using an SNMP-compatible network management application and the network device's Management Interface Base ("MIB") files. Normally, however, in order to perform in-band administrative tasks of a network device, such as configuration and management, the network device must first be assigned an IP address. Additionally, in order to use in-band configuration and management capabilities, the SNMP management platform of the network device must be configured to understand and be able to access the objects contained in the network device's MIB.

Embodiments of the present invention use a subset of the Transmission Control Protocol/Internet Protocol ("TCP/IP") suite as the underlying mechanism to transport the SNMP configuration and management data. Without limitation, the protocols implemented in embodiments of the present invention include the Internet Protocol ("IP"), the Internet Control Message Protocol ("ICMP"), the User Datagram Protocol ("UDP"), the Trivial File Transfer Protocol ("TFTP"), the Bootstrap Protocol ("BOOTP"), and the Address Resolution Protocol ("ARP").

The MIB variables of network devices according to embodiments of the present invention are accessible through SNMP. SNMP is an application-layer protocol designed to facilitate the exchange of management information between network devices. SNMP is used to monitor IP gateways and their networks, and defines a set of variables that the gateway must keep and specifies that all operations on the gateway are a side effect of fetching or storing to data variables. SNMP consists of three parts: a Structure of Management Information ("SMI"), a Management Information Base ("MIB") and the protocol itself. The SMI and MIB define and store the set of managed entities, while SNMP itself conveys information to and from the SMI and the MIB.

Instead of defining a large set of commands, SNMP places all operations in a get-request, get-next-request, and set-request format. For example, an SNMP manager can get a value from an SNMP agent or store a value into that SNMP agent. The SNMP manager can be part of a network management system ("NMS"), and the SNMP agent can reside on a networking device such as a LAN switch. The switch MIB files may be compiled with network management software, which then permits the SNMP agent to respond to MIB-related queries being sent by the NMS.

An example of an NMS is the CiscoWorks™ network management software, available from Cisco Systems, Inc. of San Jose, Calif. CiscoWorks™ uses the switch MIB variables to set device variables and to poll devices on the network for specific information. Among other tasks, the CiscoWorks™ software permits the results of a poll to be displayed as a graph and analyzed in order to troubleshoot internetworking problems, increase network performance, verify the configuration of devices, and monitor traffic loads. Other products known to those of ordinary skill in the art, available from several other vendors, provide similar functionality.

Figure 6:
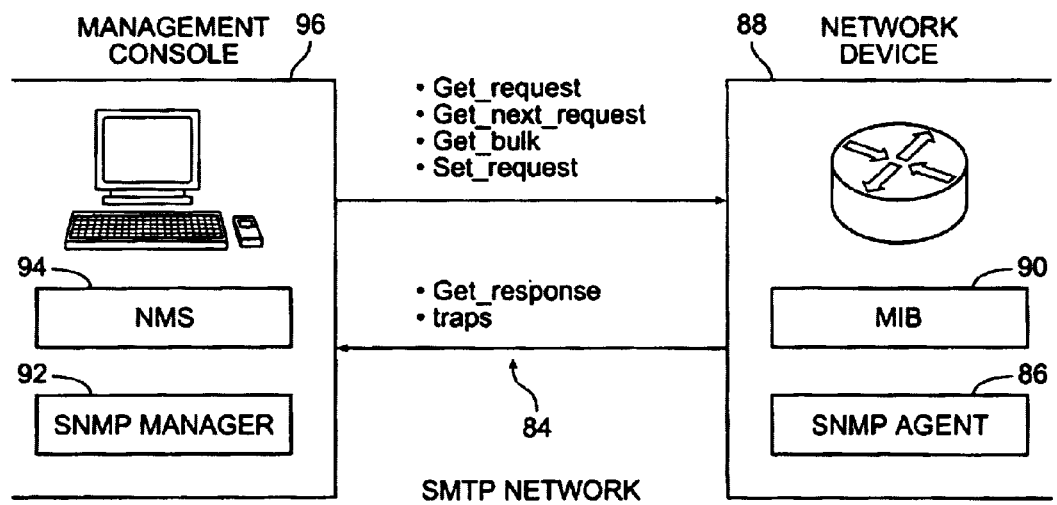
FIG. 6 is a block diagram illustrating an exemplary SNMP network.

Referring now to FIG. 6, an exemplary SNMP network 84 is shown. The SNMP agent 86 in network device 88 gathers data from the MIB 90, also in network device 88. The MIB 90 is the repository for information about device parameters and network data. The SNMP agent 86 can send traps, or notification of certain events, to the SNMP manager 92, which is part of the Network Management Software ("NMS") 94 running on the management console 96. The SNMP manager 92 uses information in the MIB 90 to perform the operations described in Table 1.

TABLE 1

SNMP Manager Operations

| Operation | Description |
|---|---|
| Get-request | Retrieve a value from a specific variable. |
| Get-next-request | Retrieve a value from a variable within a table. With this operation, an SNMP manager does not need to know the exact variable name. A sequential search is performed to find the needed variable within a table. |
| Get-response | The reply to a get-request, get-next-request, and set-request sent by an NMS. |
| Set-request | Store a value in a specific variable. |
| trap | An unsolicited message sent by an SNMP agent to an SNMP manager indicating that some event has occurred. |

Embodiments of the present invention support the following configuration and management interfaces: HTML (web-based) interfaces, SNMP, and a proprietary Internet Operating System ("IOS") command line interpreter ("CLI"). Each of these management interfaces can be used to monitor and configure a LAN switch or a group of switches, known as a cluster. The cluster management tools are web-based, and may be accessed via an ordinary browser, such as Netscape Navigator or Microsoft Internet Explorer™. Embedded HTML-based management tools display images of switches and graphical user interfaces.

Figure 7:
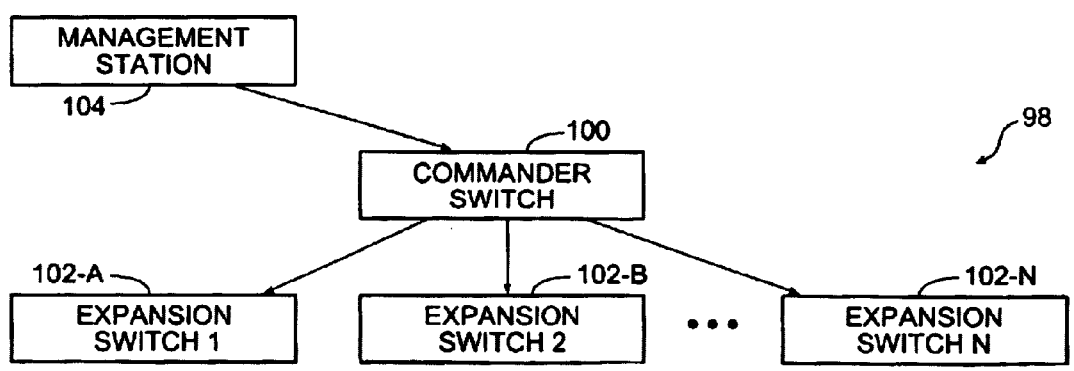
FIG. 7 is a block diagram illustrating a cluster of network devices according to one aspect of the present invention.

When LAN switches are grouped into clusters, one switch is called the commander switch, and the other switches are called expansion switches. Referring now to FIG. 7, an exemplary switch cluster 98 is shown which includes a commander switch 100 and one or more expansion switches 102-A–102-N. Management station 104 is connected to the commander switch 100, which redirects configuration requests to the expansion switches 102-A–102-N.

According to the present invention, a single IP address for the entire cluster 98 is assigned to the commander switch 100, which distributes configuration information to the other switches in the cluster. In one embodiment, a cluster with up to 15 expansion switches may be configured and managed via the IP address of the commander switch 100. The expansion switches 102-A–102-N in the cluster do not need individual IP addresses.

According to embodiments of the present invention, the web-based management features are based on an embedded HTML web site within the Flash -memory of each network device in the cluster. Web-based management uses the Hypertext Transfer Protocol ("HTTP"), an in-band form of communication, which means that the Web-based management features of the network device are accessed through one of the Ethernet ports that are also used to receive and transmit normal data in each network device.

HTTP is an application-level protocol for distributed, collaborative, hypermedia information systems. HTTP allows an open-ended set of methods that indicate the purpose of a request. It builds on the discipline of reference provided by the Uniform Resource Identifier ("URI"), as a location ("URL") or name ("URN"), for indicating the resource to which a method is to be applied. Messages are passed in a format similar to that used by Internet mail as defined by the Multipurpose Internet Mail Extensions ("MIME").

The HTTP protocol is a request/response protocol. A client sends a request to the server in the form of a request method, URI, and protocol version, followed by a MIME-like message containing request modifiers, client information, and possible body content over a connection with a server. The server responds with a status line, including the message's protocol version and a success or error code, followed by a MIME-like message containing server information, entity metainformation, and possible entity-body content. Most HTTP communication is initiated by a user agent and consists of a request to be applied to a resource on some origin server. In the simplest case, this may be accomplished via a single connection between the user agent and the origin server.

A more complicated situation occurs when one or more intermediaries are present in the request/response chain. There are three common forms of intermediary: proxy, gateway, and tunnel. A proxy is a forwarding agent, receiving requests for a URI in its absolute form, rewriting all or part of the message, and forwarding the reformatted request toward the server identified by the URI. A gateway is a receiving agent, acting as a layer above some other server(s) and, if necessary, translating the requests to the underlying server's protocol. A tunnel acts as a relay point between two connections without changing the messages; tunnels are used when the communication needs to pass through an intermediary (such as a firewall) even when the intermediary cannot understand the contents of the messages.

HTTP communication usually takes place over TCP/IP connections. The default port is TCP 80, but other ports can be used. This does not preclude HTTP from being implemented on top of any other protocol on the Internet, or on other networks. HTTP only presumes a reliable transport. Thus, any protocol that provides such guarantees can also be used.

The HTTP GET method is used to retrieve whatever information (in the form of an entity) is identified by the Request-URI. If the Request-URI refers to a data-producing process, it is the produced data which shall be returned as the entity in the response and not the source text of the process, unless that text happens to be the output of the process.

The HTTP POST method is used to request that the destination server accept the entity enclosed in the request as a new subordinate of the resource identified by the Request-URI in the Request-Line. POST is designed to allow a uniform method to cover the following functions: (1) annotation of existing resources; (2) posting a message to a bulletin board, newsgroup, mailing list, or similar group of articles; (3) providing a block of data, such as the result of submitting a form, to a data-handling process; and (4) extending a database through an append operation.

The actual function performed by the POST method is determined by the server and is usually dependent on the Request-URI. The posted entity is subordinate to that URI in the same way that a file is subordinate to a directory containing it, a news article is subordinate to a newsgroup to which it is posted, or a record is subordinate to a database.

Forming a Cluster of Network Devices

Figure 8:
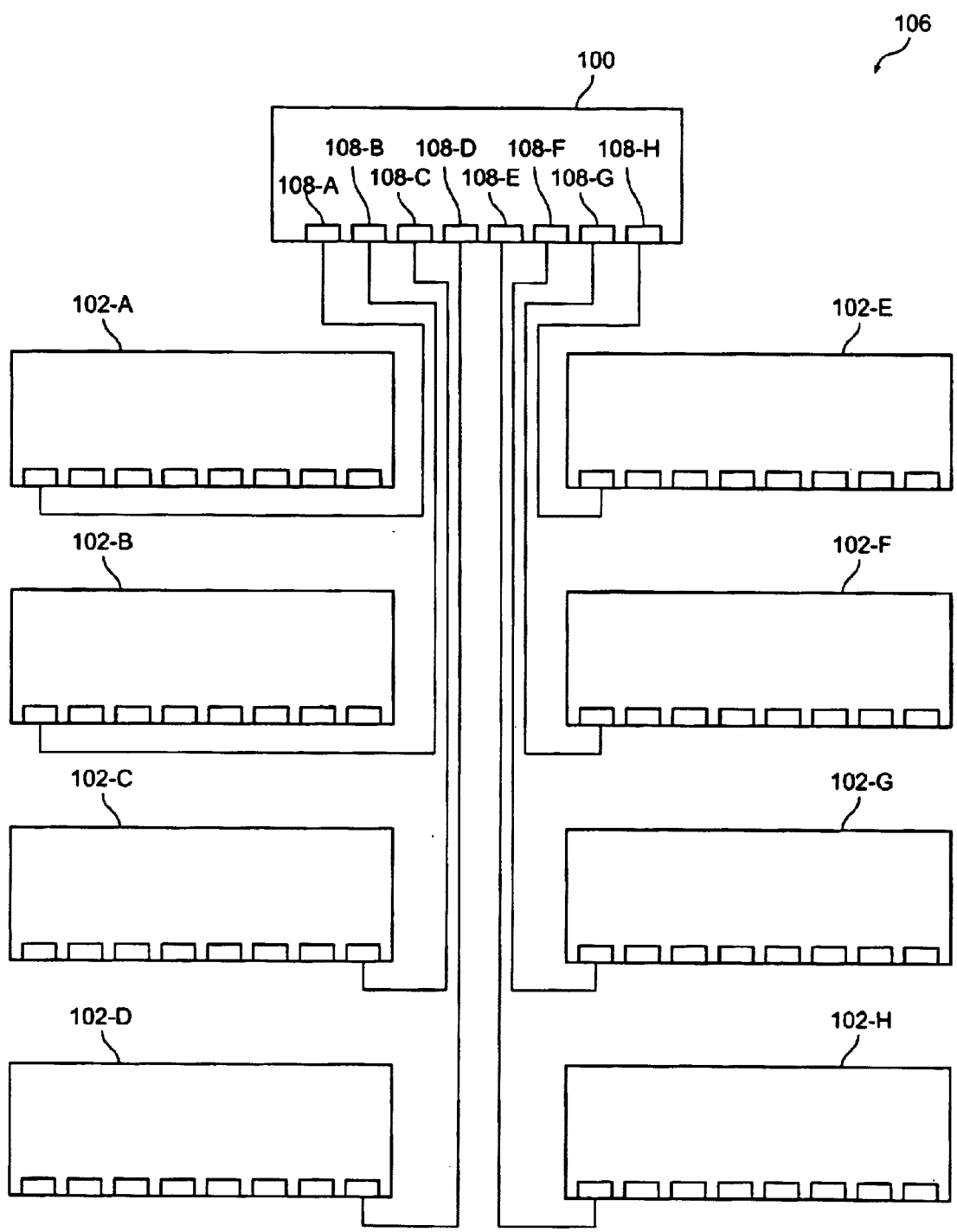
FIG. 8 is a block diagram illustrating a cluster of network devices in a star configuration according to one aspect of the present invention.

A cluster is a group of connected switches that are managed as a single entity. The switches can be in the same location, or they can be distributed across a network. According to embodiments of the present invention, all communication with cluster switches is through a single IP address assigned to the commander switch. Clusters may be configured in a variety of topologies. As an example, FIG. 8 illustrates a switch cluster 106 configured in a "star," or "radial stack," topology. In this configuration, each of the eight expansion switches 102-A–102-H in cluster 106 is directly connected to one of the ports 108A–108-H of commander switch 100.

Figure 9:
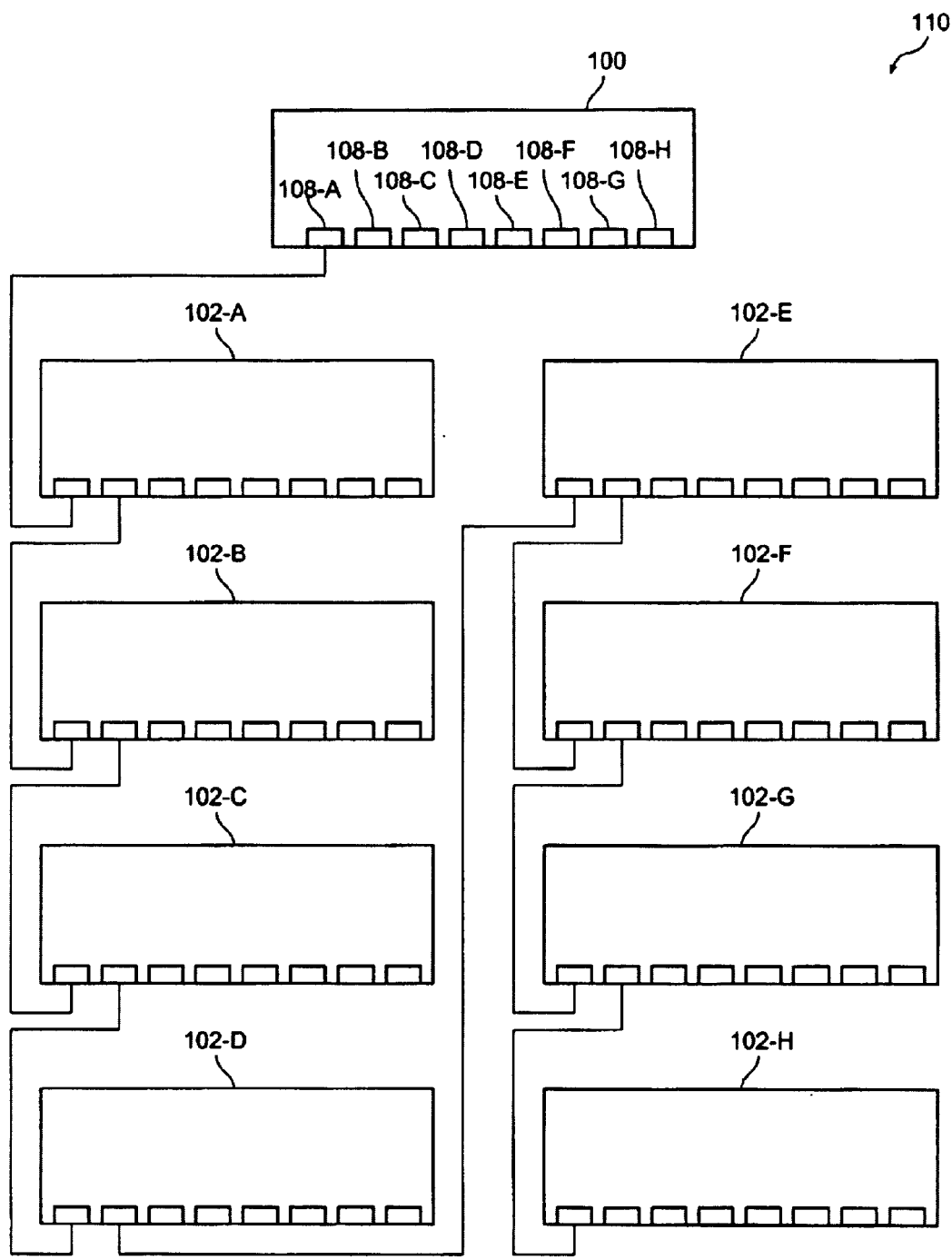
FIG. 9 is a block diagram illustrating a cluster of network devices in a daisy chain configuration according to one aspect of the present invention.

A second example of a cluster configuration, known as a "daisy chain" configuration, is shown in FIG. 9. In cluster 110, only expansion switch 102-A is directly connected to the commander switch 100. Expansion switches 102-B–102-G are each connected to an "upstream" switch (one that is fewer "hops" away from commander switch 100) and to a "downstream" switch (one that is more "hops" away from commander switch 100). Finally, the last switch in the chain (expansion switch 102-H) is only connected to its upstream "neighbor" 102-G.

Figure 10:
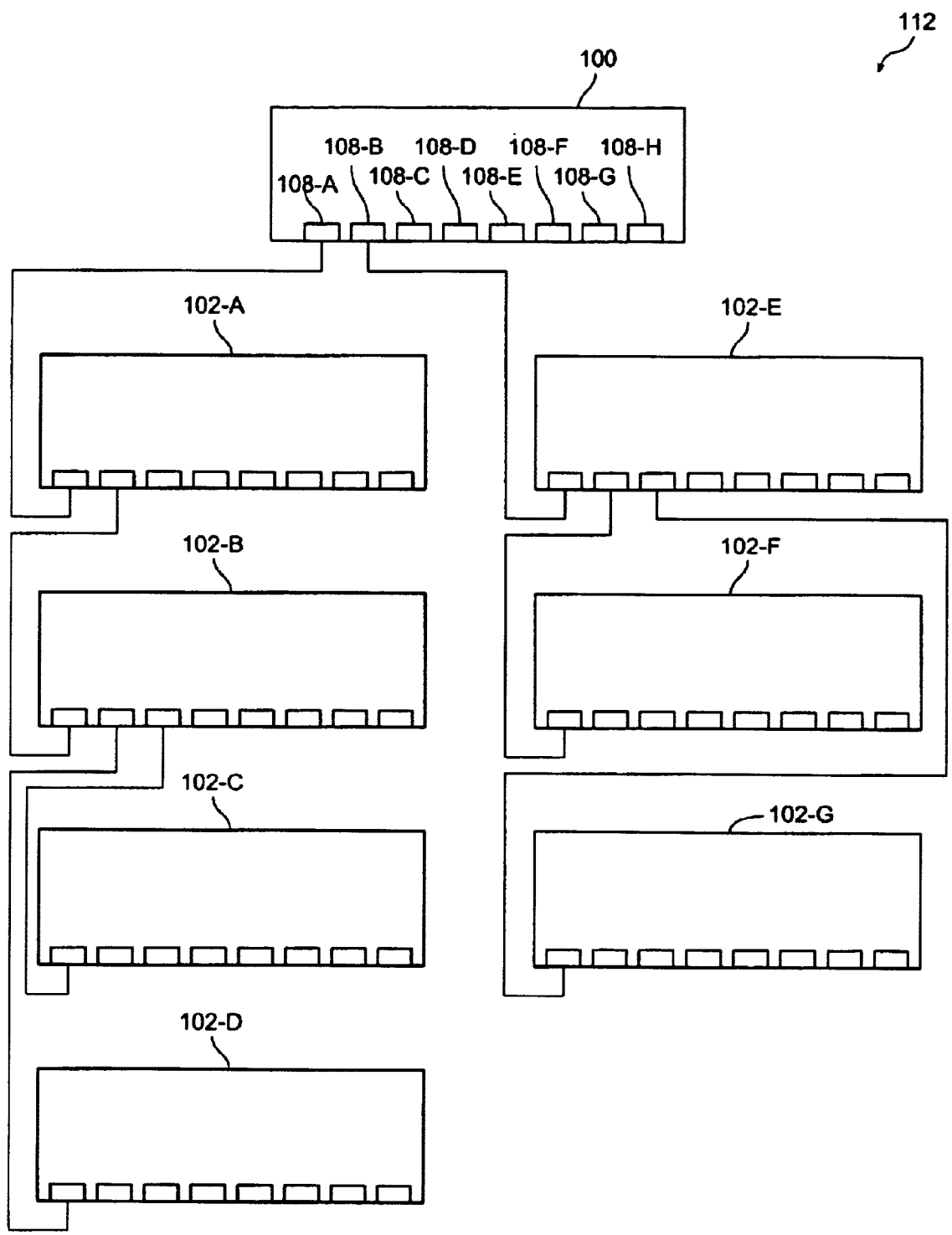
FIG. 10 is a block diagram illustrating a cluster of network devices in a hybrid configuration according to one aspect of the present invention.

As a third example, FIG. 10 illustrates a "hybrid" cluster configuration with one commander switch 100 and seven expansion switches 102-A–102-G. In cluster 112, expansion switches 102-A and 102-E are in a star configuration with respect to commander switch 100. Expansion switch 102-B is in a daisy chain configuration with respect to expansion switch 102-A, while expansion switches 102-C and 102-D are in a star configuration with respect to expansion switch 102-B. Finally, expansion switches 102-F and 102-G are in a star configuration with respect to expansion switch 102-E. Thus, hybrid cluster 112 as shown in FIG. 10 consists of a combination of star and daisy chain configurations.

It is to be understood that many more cluster configurations are possible, and that the above examples are not in any way limiting.

The commander switch is the single point of access used to configure and monitor all the switches in a cluster. According to embodiments of the present invention, expansion switches are managed through a commander switch. The commander switch is used to manage the cluster, and is managed directly by the network management station. Expansion switches operate under the control of the commander. While they are a part of a cluster, expansion switches are not managed directly. Rather, requests intended for an expansion switch are first sent to the commander, then forwarded to the appropriate expansion switch in the cluster.

When switches are first installed, they are cabled together according to the network configuration desired for a particular application, and an IP address is assigned to the commander switch. In addition, the commander switch must be enabled as the commander switch of the cluster. Once the commander switch has been enabled, it can use information known about the network topology to identify other network devices in the network that may be added to the cluster. According to one embodiment of the present invention, the commander switch uses the Cisco™ Discovery Protocol ("CDP") to automatically identify candidate network devices. However, other similar products known to those of ordinary skill in the art are available from other vendors to accomplish the same task. Alternatively, discovery of candidate network devices may be performed manually by inspecting the network topology and the network devices attached to the network.

CDP is a media-independent device discovery protocol which can be used by a network administrator to view information about other network devices directly attached to a particular network device. In addition, network management applications can retrieve the device type and SNMP-agent address of neighboring network devices. This enables applications to send SNMP queries to neighboring devices. CDP thus allows network management applications to discover devices that are neighbors of already known devices, such as neighbors running lower-layer, transparent protocols.

It is to be understood that the present invention is not limited to devices that are compatible with CDP. CDP runs on all media that support the Subnetwork Access Protocol ("SNAP"), including LAN and Frame Relay. CDP runs over the data link layer only. Each network device sends periodic messages to a multicast address and listens to the periodic messages sent by others in order to learn about neighboring devices and determine when their interfaces to the media go up or down. Each device also advertises at least one address at which it can receive SNMP messages. The advertisements contain holdtime information, which indicates the period of time a receiving device should hold CDP information from a neighbor before discarding it. With CDP, network management applications can learn the device type and the SNMP agent address of neighboring devices. This process enables applications to send SNMP queries to neighboring devices.

Once a switch cluster is formed, any of the switches in the cluster may be accessed by entering the IP address of the commander switch into a Web browser. The single password that is entered to log in to the commander switch also grants access to all the expansion switches in the cluster.

The method of creating a cluster of Ethernet switches depends on each particular network configuration. If the switches are arranged in a star topology, as in FIG. 8, with the commander switch at the center, all of the expansion switches may be added to the cluster at once. On the other hand, if the switches are connected in a daisy-chain topology, as in FIG. 9, the candidate switch that is connected to the commander switch is added first, and then each subsequent switch in the chain is added as it is discovered by CDP. If switches are daisy-chained off a star topology, as in the exemplary hybrid configuration shown in FIG. 10, all the switches that are directly connected to the commander switch may be added first, and then the daisy-chained switches may be added one at a time.

In embodiments of the present invention, there can be a maximum of sixteen switches in a cluster: fifteen expansion switches and one commander switch. If passwords are defined for the candidate expansion switches, the network administrator must know them all before they can be added to the cluster. In addition, a candidate switch according to embodiments of the present invention must not already be a member switch or a commander switch of another active cluster.

If the commander switch of a cluster fails, member switches continue forwarding but cannot be managed through the commander switch. Member switches retain the ability to be managed through normal standalone means, such as the console-port CLI, and they can be managed through SNMP, HTML, and Telnet after they have been assigned an IP address. Recovery from a failed command switch can be accomplished by replacing the failed unit with a cluster member or another switch. To have a cluster member ready to replace the commander switch, the network administrator must assign an IP address to another cluster member, and know the command-switch enable password for that switch.

According to embodiments of the present invention, when a cluster is formed, the commander switch automatically changes three parameters on all the expansion switches in the cluster: the IOS host name, the enable password, and the SNMP community string. If a switch has not been assigned an IOS host name, the commander switch appends a number to the name of the commander switch and assigns it sequentially to the expansion switches. For example, a commander switch named eng-cluster could name a cluster expansion switch eng-cluster-5. If an IOS host name has already been assigned to a switch, the switch retains its IOS host name.

Figure 11:
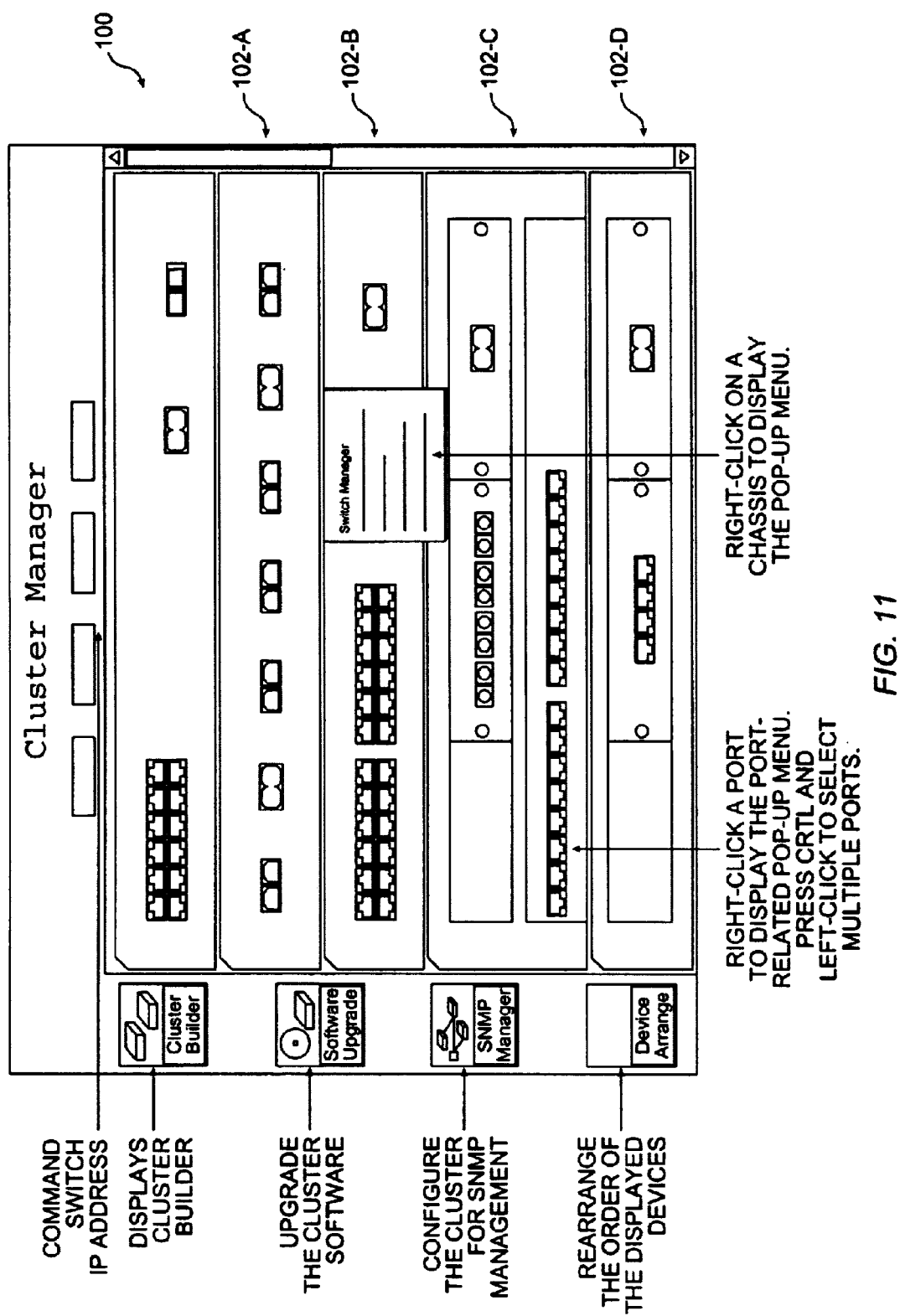
FIG. 11 is a sample configuration screen for a switch cluster according to one aspect of the present invention.

Once a cluster has been created, network management software such as the Cluster Manager™ program, available from the assignee of the present invention, may be used to monitor and configure the switches in the cluster. FIG. 11 shows a switch cluster with one commander switch 100 and four expansion switches 102-A–102-D as it is displayed on a sample Cluster Manager™ page.

One advantage of the present invention is that a network administrator need set only one IP address, one password, and one system SNMP configuration in order to manage an entire cluster of switches. A cluster can be formed from switches located in several different buildings on a campus, and may be linked by fiber optic, Fast Ethernet, or Gigabit Ethernet connections.

Clusters may be managed from a management station through ASCII terminal consoles, telnet sessions, SNMP management stations and Web Consoles. All configuration and management requests are first directed to the cluster commander. Any required authentication is done by the commander. If necessary, the commander acts as a redirector and forwards requests to the appropriate expansion switch and forwards the reply to the management station. According to embodiments of the present invention, an expansion switch can be in only one cluster at a time and can have only one commander.

There is no restriction on the type of connections between a commander switch and expansion switches. In one embodiment of the present invention, a cluster can be formed for a fully interconnected group of CDP neighbors. A network device can join a cluster when the network device is a CDP neighbor of the cluster. Without limitation, switches in a cluster may be interconnected using 10 Mbps Ethernet, 100 Mbps Fast Ethernet, or 1000 Mbps Gigabit Ethernet.

The primary external configuration and management interface to the cluster is a TCP/IP connection to the commander switch. HTTP, SNMP, and telnet protocols run on top of the IP stack in the operating system. Alternatively, the cluster may also be managed via the console port of the commander.

Thus, as shown in FIG. 7, a Web browser on the management station 104 communicates with the switch cluster 98 by establishing an HTTP connection to the commander switch 100. Special CLI commands help present output from the commander switch 100 to the browser in a format that is easily processed on the browser. Communication between the commander switch 100 and expansion switches 102-A–102-N is accomplished by the commander switch 100 translating the desired actions into commands the expansion switches 102-A–102-N would be able to interpret if they were acting as stand-alone switches, i.e., if they were not part of a cluster.

The commander switch 100 manages SNMP communication for all switches in the cluster 98. The commander switch 100 forwards the set and get requests from SNMP applications to expansion switches 102-A–102-N, and it forwards traps and other responses from the expansion switches 102-A–102-N back to the management station 104. In one embodiment of the present invention, read-write and read-only community strings are set up for an entire cluster. Community strings provide authentication in the exchange of SNMP messages. The commander switch appends numbers to the community strings of expansion switches so that these modified community strings can provide authentication for the expansion switches. When a new switch is added to the cluster, a community string is created for it from the community string for the cluster. Only the first read-only and read-write community strings are propagated to the cluster.

Figure 12:
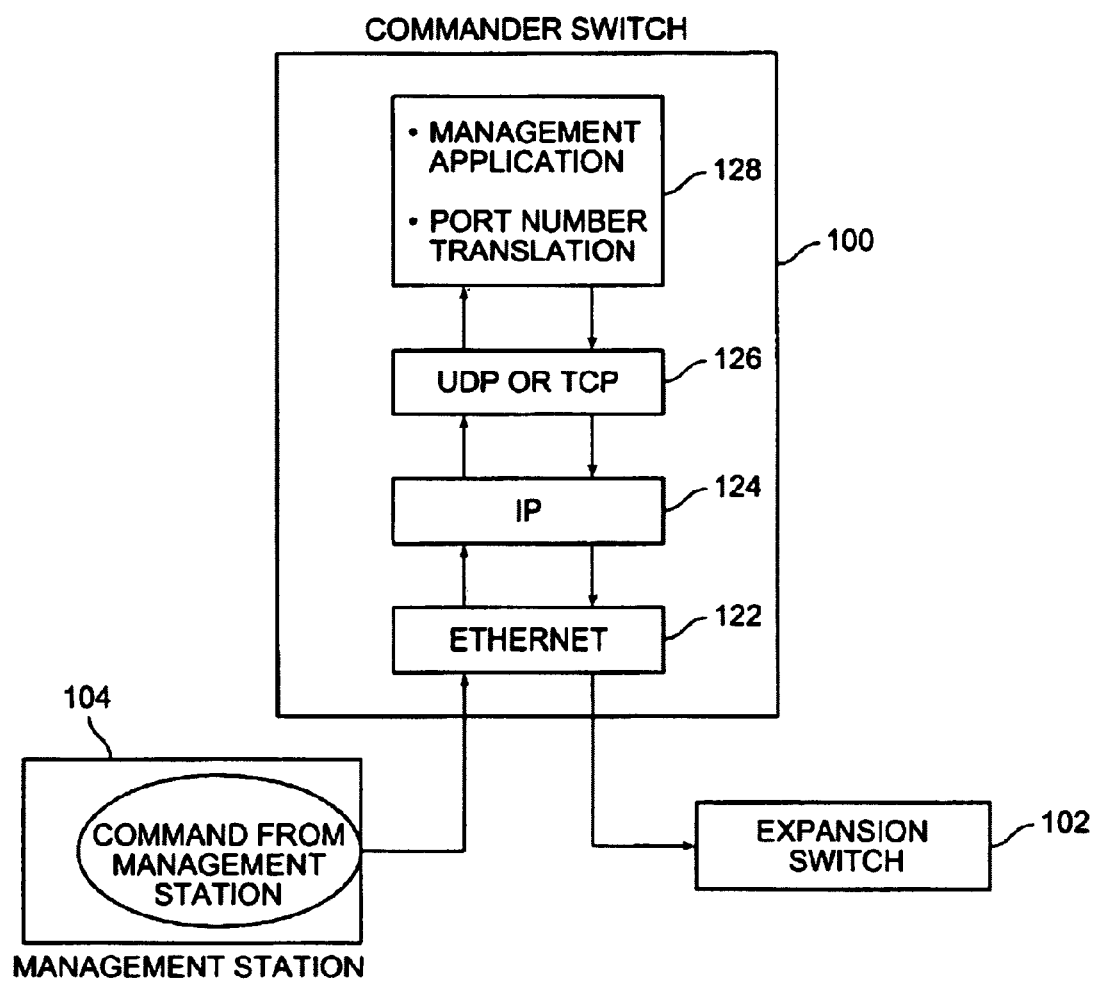
FIG. 12 is a block diagram of configuration data packet processing by a commander device according to one aspect of the present invention.

Configuration and management data packets are sent between the commander 100 and expansion switches 102-A–102-N via the network connection. The commander 100 identifies each expansion switch 102-A–102-N by the MAC address of the port on the expansion switch that is connected to the commander 100. FIG. 12 illustrates in block diagram form how a packet intended for an expansion switch is processed by the commander. A command from the management station 104 is received by the Ethernet module 122 of the commander switch 100. The command is processed at the IP layer 124, UDP or TCP layer 126, and Management Application layer 128 of the commander switch 100. The Management Application layer 128 determines that the command is intended for expansion switch 102, and performs redirection by translating the port number in the received command to the appropriate port for expansion switch 102. The redirected command flows down through the UDP or TCP layer 126, the IP layer 124, and the Ethernet layer 122 of the commander switch 100, and is passed on via Ethernet to the expansion switch 102.

Cluster Neighbor Information

According to embodiments of the present invention, each network device capable of being a cluster commander contains a cluster_member data structure to store its own information. FIG. 13 illustrates the contents of the cluster_member data structure for one embodiment of the present invention. Only the mbr_MACAddr, mbr_ipaddr, platform_name and host_name fields are valid for cluster non-members. The mbr_numhops field is not valid for a non-member because the device could be a neighbor of more than one cluster. The command port of a member is defined as the STP_FWD/STP_BLK port which is the fewest hops away from the commander.

A cluster_neighbor data structure is created for each CDP neighbor seen on a network device according to the present invention. This structure is stored on each network device for all its CDP neighbors so that there is no waiting for new CDP information if a device is added to the cluster. This information is sent from each cluster member to the commander at predetermined intervals or upon request from the commander, along with information from the cluster_member data structure and the CDP cache. FIG. 14 illustrates the contents of the cluster_neighbor data structure for one embodiment of the present invention.

On embodiments of the present invention, a member's neighbor information is stored in a linked list along with a pointer to the receiving port's swidb, the CDP device number used to match the CDP cache entry, and an neighbor age indicator. Configuration data for the cluster members are kept in a linked list on the commander in member number order. Pointers to the member structures are also kept in an a 16-entry hash table. The hash table allows quick access to a member, whereas the linked list allows the cluster members to be displayed easily.

Similarly, the neighbors are kept in a linked list and in a 32-entry hash table whose hashing algorithm XORs the three low-order bytes of the MAC address and uses the resulting lowest 5 bits as the index into the hash table. To be an exact match, a neighbor must match the connected member number, the MAC address, and the portID of the port connecting to that member. The hash table allows quick access to a particular neighbor and the linked list allows neighbors to be displayed easily.

According to embodiments of the present invention, HTTP redirection allows the commander switch to act as an HTTP server for the entire cluster. HTTP requests are sent to the commander and, depending on the contents of the Universal Resource Identifier ("URI"), they are either processed on the commander or redirected to an expansion switch. If an HTTP request is redirected to an expansion switch, the response is also redirected back to the original requester.

In embodiments of the present invention, HTTP redirection thus provides a way to access web pages stored on an expansion switch via the commander. Redirection is done by the commander when the URL is of the form:

http://commander_hostname_or_IP/es[n]/file where [n] is corresponds to the number of the expansion switch in the cluster. For example, the following two URL's would both reference the file file_1.html on expansion switch 3:

http://10.10.10.10/es3/file_1.html or http://www.switch_cluster.com/es3/file_1.html.

Unless the HTML specifies a host, hypertext references from Web pages retrieved from expansion switch es[n] refer to files on expansion switch es[n]. For example, http://www.switch_cluster.com/es3/file_1.html provides web console access to expansion switch 3.

FIG. 15 illustrates how the HTTP redirector works. First, a TCP connection is established from a Web browser in the management station 104 to the HTTP server on the commander 100. Information about this HTTP connection is stored in the httpstate data structure. The HTTP server on the commander 100 then establishes a new forwarding TCP connection to the HTTP server on the expansion switch 102. The data in the HTTP request are read from the initial TCP connection and written to the forwarding TCP connection. As the request is forwarded, the commander 100 must examine the request data stream to determine if the complete request has been received. In one embodiment of the present invention, for GET requests, the stream will be examined for a terminating four byte octet sequence of CR, LF, CR, LF. For POST requests, the request header fields must be parsed for the "content length" field, which will be used to determine how long the request will be.

The HTTP response data are retrieved from the expansion switch by reading from the forwarding TCP connection and sent to the web browser by writing to the initial TCP connection. HTTP uses its TCP connection in a half duplex manner. This means that only when a complete request is sent to the server is the response sent back to the web browser. The HTTP redirector will first redirect the request, and then it will redirect the response.

In order to determine when an entire request has been received, the HTTP redirector must use different methods for GET and POST requests. In one embodiment of the present invention, the end of a GET request is flagged by the character sequence CR-LF-CR-LF, where LF is the linefeed character and CR is the carriage return character. Similarly, the end of a POST request is determined by scanning the request's HTTP header for a "content-length" field, which can be used to determine the length of the POST request.

A portion of the httpstate, the URI, is examined to determine if a request will be redirected, or if it will be allowed to be processed locally. If the request can be processed locally, the data stream may not be modified in a way that disrupts parsing the request.

In one embodiment of the present invention, a new HTTP CASE registry named http_redirect_request is introduced that is invoked by HTTP when the first token of an SNMP request has been read. This registry is invoked from http_parse_get_request( ) and http_parse_post_request( ) after the URI has been parsed, but before the HTTP headers are parsed. A small change is necessary to the platform independent http_parse_get_request( ) and http_parse_post_request( ) routines in order to insert the reg_invoke between the processing of the URI and the rest of the HTTP header.

The invocation of the new http_redirect_request registry works as follows. For each TCP connection, http listen() starts http_daemon. When a request is being processed, the daemon parses the URI. If a URI containing an "es[n]" string (e.g., "es3") is found, the http redirect request() registry is invoked. The HTTP redirector then examines the URI in the httpstate data structure. If it contains the forwarding string, the request is redirected and TRUE is returned. Otherwise, the request is not redirected, and FALSE is returned.

In one embodiment of the present invention, when http_redirect_requesto is invoked, it looks for an "es[n]" string (e.g., "es3"). If an "es[n]" string is found, the corresponding cluster IP address is obtained from a look-up table in the commander switch. If no cluster IP address is found, http_redirect_requesto returns an error. Otherwise, either the forward_get( ) function or forward_post( ) function is invoked as appropriate.

Those of ordinary skill in the art will recognize that a "TCB" is a control block that describes a TCP connection. The fwd_tcb TCB is used by the redirector to forward the modified request to the expansion device and receive the reply from the expansion device. The forward_get( ) function uses the target cluster IP address to get fwd_tcb, then writes "get request" to fwd_tcb. The forward_get( ) function continues to write the request until it either sees the data stream terminated by a predetermined data sequence, or a time out occurs. Then, it reads the response from fwd_tcb, and writes the response to the TCB associated with standard output (out_tcb).

The forward_post( ) function works similarly to forward_get( ), except that the HTTP header is parsed for the content length of the entity body contained in the POST request, and the request is read until the length of the entity body has been transmitted to the expansion switch. The forward_post( ) function uses the target IP address to get a TCB (fwd_tcb), then writes "start of post" to fwd_tcb. The function then parses through the HTTP header until it finds the content length field. Then, it reads the remainder of the post request from the input tcb (state->tcb), using the content length field to determine the length of the request, and writes it to fwd_tcb. The response is then read from fwd_tcb and written to the TCB associated with standard output (out_tcb).

The send_request_to_tcp( ) function is responsible for forwarding the initial packet of the request. In the case of a HTTP GET, this is sufficient. In the case of a HTTP POST, however, additional data must be read from the Web browser and forwarded to the expansion switch.

In order to send commands via HTTP from the commander switch to the expansion switch, a method is needed to be able to issue an authorized command without having a clear text version of the enable password available. This can be achieved by making the commander of an expansion switch explicitly authorized to perform fully enabled commands on the expansion switches.

For this purpose, the URI can have a special string appended to it that signifies that the access level of this URI should be determined in a special manner. In the http_ daemon's http_authenticate( ) routine, a registry is added that allows an expansion switch to authenticate a URI with the special authentication prefix. The http_authenticate( ) LOOP registry compares the IP address of the request sender to the CMP address of the commander, and it also checks the IP ARP table to ensure that the CMP address of the commander currently is associated with the MAC address of the commander. In this way, if a Web browser were to include the string "/level/CMP" at the end of a URI that was being redirected, it could execute an enabled command without an enable password. The HTTP redirector must filter out any HTTP requests that attempt to use implicit commander authentication, and return an authorization error to the requestor.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for managing a cluster of network devices, said method comprising:

assigning an IP address for the cluster to a first network device selected as a commander network device, remaining network devices being expansion network devices;

establishing a first HTTP connection from a management station to the first network device using the cluster IP address;

receiving a network device management request at the first network device, the request including a Universal Resource Identifier (URI) indicating one of the network devices in the cluster and management data for the indicated network device;

determining if the URI indicates an expansion network device;

establishing a forwarding HTTP connection from the first network device to the expansion network device indicated by the URI; and redirecting the request to the expansion network device indicated by the URI.

2. The method according to claim 1, wherein the first network device is a LAN switch.

3. The method according to claim 2, wherein the second network device is a LAN switch.

4. The method according to claim 1, wherein the predetermined data pattern is a four byte octet sequence consisting of CR-LF-CR-LF.

5. The method in accordance with claim 1 wherein said redirecting includes:

reading the management data in the request from the first HTTP connection; and writing the management data to the forwarding HTTP connection.

6. The method in accordance with claim 5 wherein said redirecting further includes:

determining whether the entire management data has been received from the first HTTP connection.

7. The method in accordance with claim 6 wherein said determining includes:

comparing the management data stream to a predetermined data pattern indicating termination of the data stream.

8. The method in accordance with claim 7 wherein the request is a GET request.

9. The method in accordance with claim 5 wherein said determining includes:

parsing a header of the request and extracting a field containing a length of the request.

10. The method in accordance with claim 9 wherein the request is a POST request.

11. The method in accordance with claim 1 wherein the URI includes Universal Resource Location (URL) and Universal Resource Name (URM).

12. The method in accordance with claim 1 wherein the URI includes a string specific to the corresponding expansion network device.

13. The method in accordance with claim 1, further comprising:

processing the request at the first network device if the URI does not indicate any one of the expansion network devices.

14. The method in accordance with claim 1, further comprising:

redirecting a response from the expansion network device to the management station by reading response data in the response from the forwarding HTTP connection and writing the response data to the first HTTP connection at the first network device.

15. The method in accordance with claim 1, further comprising:

authenticating the redirected request at the expansion network device.

16. The method in accordance with claim 15 wherein said authenticating includes:

comparing an IP address of a sender of the request with a Cluster Management Protocol (CMP) address of the commander.

17. The method in accordance with claim 16 wherein said authenticating further includes:

checking the CMP address of the commander is associated with a Media Access Control (MAC) address of the commander using an IP Address Resolution Protocol (ARP) table.

18. The method in accordance with claim 1 wherein the first HTTP connection includes:

a first Transmission Control Protocol (TCP) connection established between the management station and an HTTP server on the first network device.

19. The method in accordance with claim 18 wherein the forwarding HTTP connection includes:

a forwarding TCP connection established between the HTTP server on the first network device and an HTTP server on the expansion network device, thereby providing the management station with Web access to the expansion network device.

20. A cluster of network devices, said cluster comprising:

a commander network device having an IP address, said commander network device capable of receiving a network device management request from a management station via a first HTTP connection, and redirecting the request via a forwarding HTTP connection, the request including a Universal Resource Identifier (URI) indicating one of the network devices in the cluster and management data for the indicated network device; and at least one expansion network device capable of receiving the redirected request from the forwarding HTTP connection, wherein said commander network device includes:
a request redirector for receiving the request, determining if the URI indicates an expansion network device, and forwarding the request to the expansion network device indicated by the URI.

21. The cluster of network devices according to claim 20, wherein said commander network device is a LAN switch.

22. The cluster of network devices according to claim 21, wherein said expansion network devices are LAN switches.

23. The cluster of network devices according to claim 20, wherein said commander network device has a non-private IP address and said expansion devices have private IP addresses.

24. The cluster of network devices according to claim 20, wherein said network devices in the cluster transmit data to other network devices to discover whether additional network devices may be added to the cluster.

25. The cluster in accordance with claim 20 wherein said request redirector includes:
a read module for reading the management data in the request from the first HTTP connection; and
a write module writing the management data to the forwarding HTTP connection.

26. The cluster in accordance with claim 20 wherein said request redirector further includes:
an end determiner module for determining whether the entire management data has been received from the first HTTP connection.

27. The cluster in accordance with claim 26 wherein said end determiner module compares the management data stream to a predetermined data pattern indicating termination of the data stream.

28. The cluster in accordance with claim 27 wherein the request is a GET request.

29. The cluster in accordance with claim 26 wherein said end determiner module parses a header of the request and extracting a field containing a length of the request.

30. The cluster in accordance with claim 29 wherein the request is a POST request.

31. The cluster in accordance with claim 20 wherein the URI includes Universal Resource Location (URL) and Universal Resource Name (URM).

32. The cluster in accordance with claim 20 wherein the URI includes a string specific to the corresponding expansion network device.

33. The cluster in accordance with claim 20 wherein said commander network device locally processes the request if the URI does not indicate any one of the expansion network devices.

34. The cluster in accordance with claim 20 wherein said commander network device further includes:
a response redirector for redirecting a response from the expansion network device to the management station.

35. The cluster in accordance with claim 34 wherein said response redirector includes:
a read module for reading response data in the response from the forwarding HTTP connection; and
a write module for writing the response data to the first HTTP connection.

36. The cluster in accordance with claim 20 wherein said expansion device includes:
an authentication module for authenticating the redirected request.

37. The cluster in accordance with claim 36 wherein said authentication module compares an IP address of a sender of the request with a Cluster Management Protocol (CMP) address of the commander.

38. The cluster in accordance with claim 37 wherein said authentication module checks the CMP address of the commander is associated with a Media Access Control (MAC) address of the commander using an IP Address Resolution Protocol (ARP) table.

39. The cluster in accordance with claim 20 wherein said commander network device includes:
an HTTP server for establishing a first Transmission Control Protocol (TCP) connection from the management station, and for establishing a forwarding TCP connection to an HTTP server on said expansion network device, thereby providing the management station with Web access to the expansion network device.

40. A system for managing a cluster of network devices, said system comprising:
a management station capable of sending a network device management request via a first HTRP connection, the request including a Universal Resource Identifier (URI) indicating one of the network devices in the cluster and management data for the indicated network device;
a commander network device capable of receiving the request from the first HTTP connection, and redirecting the request via a forwarding HTTP connection; and
at least one expansion network device capable of receiving the redirected request from the forwarding HTTP connection,
wherein said commander network device includes:
a request redirector for receiving the request, determining if the URI indicates an expansion network device, and forwarding the request to the expansion network device indicated by the URI.

41. The system in accordance with claim 40 wherein said request redirector includes:
a read module for reading the management data in the request from the first HTTP connection; and
a write module writing the management data to the forwarding HTTP connection.

42. The system in accordance with claim 40 wherein said request redirector further includes:
an end determiner module for determining whether the entire management data has been received from the first HTTP connection.

43. The system in accordance with claim 42 wherein said end determiner module compares the management data stream to a predetermined data pattern indicating termination of the data stream.

44. The system in accordance with claim 43 wherein the request is a GET request.

45. The system in accordance with claim 42 wherein said end determiner module parses a header of the request and extracting a field containing a length of the request.

46. The system in accordance with claim 45 wherein the request is a POST request.

47. The system in accordance with claim 40 wherein the URI includes Universal Resource Location (URL) and Universal Resource Name (URM).

48. The system in accordance with claim 40 wherein the URI includes a string specific to the corresponding expansion network device.

49. The system in accordance with claim 40 wherein said commander network device locally processes the request if the URI does not indicate any one of the expansion network devices.

50. The system in accordance with claim 40 wherein said commander network device further includes:

a response redirector for redirecting a response from the expansion network device to the management station.

51. The system in accordance with claim 50 wherein said response redirector includes:

a read module for reading response data in the response from the forwarding HTTP connection; and a write module for writing the response data to the first HTTP connection.

52. The system in accordance with claim 40 wherein said expansion device includes:

an authentication module for authenticating the redirected request.

53. The system in accordance with claim 52 wherein said authentication module compares an IP address of a sender of the request with a Cluster Management Protocol (CMP) address of the commander.

54. The system in accordance with claim 53 wherein said authentication module checks the CMP address of the commander is associated with a Media Access Control (MAC) address of the commander using an IP Address Resolution Protocol (ARP) table.

55. The system in accordance with claim 40 wherein said commander network device includes:

an HTTP server for establishing a first Transmission Control Protocol (TCP) connection from the management station, and for establishing a forwarding TCP connection to an HTTP server on said expansion network device, thereby providing the management station with Web access to the expansion network device.

56. A program storage device readable by a machine, tangibly embodying a program of instructions executable by the machine to perform a method for managing a cluster of network devices, the method comprising:

assigning an IP address for the cluster to a first network device selected as a commander network device, remaining network devices being expansion network devices;

establishing a first HTTP connection from a management station to the first network device using the cluster IP address;

receiving a network device management request at the first network device, the request including a Universal Resource Identifier (URI) indicating one of the network devices in the cluster and management data for the indicated network device;

determining if the URI indicates an expansion network device;

establishing a forwarding HTTP connection from the first network device to the expansion network device indicated by the URI; and redirecting the request to the expansion network device indicated by the URI.

\* \* \* \* \*

UNITED STATES PATENT AND TRADEMARK OFFICE
CERTIFICATE OF CORRECTION

PATENT NO. : 6,654,796 B1
DATED : November 25, 2003
INVENTOR(S) : Charles Slater, Krishna and Rao Chennapragada It is certified that error appears in the above-identified patent and that said Letters Patent is hereby corrected as shown below:

Column 2,
Line 34, replace "data-traffic" with -- data traffic --.

Column 3,
Line 23, replace "the-context" with -- the context --.
Line 28, replace "frame" with -- frames --.

Column 5,
Line 62, after "in" insert -- a --.

Column 16,
Line 10, replace "http listen()" with -- http_listen () --.
Line 13, replace "http redirect request()" with -- http_redirect_ request () --.
Lines 20 and 24, replace "requesto" with -- request () --.

Column 20,
Line 17, replace "HTRP" with -- HTTP --.

Signed and Sealed this

Thirtieth Day of March, 2004

JON W. DUDAS
*Acting Director of the United States Patent and Trademark Office*